United States Patent
Truffaux

(10) Patent No.: US 6,302,264 B1
(45) Date of Patent: Oct. 16, 2001

(54) CONVEYOR SYSTEM FOR PLANTS

(76) Inventor: Hubert Truffaux, 122, rue Victor Hugo, Boves (FR), 80440

(*) Notice: Subject to any disclaimer, the term of this patent is extended or adjusted under 35 U.S.C. 154(b) by 0 days.

(21) Appl. No.: 09/382,207

(22) Filed: Aug. 26, 1999

(30) Foreign Application Priority Data

Aug. 31, 1998 (FR) .................................................. 98 11120

(51) Int. Cl.$^7$ .................................................. B65G 15/12
(52) U.S. Cl. ........................................ 198/626.1; 198/841
(58) Field of Search ................................ 198/626.1, 841, 198/836.1, 456, 345.1

(56) References Cited

U.S. PATENT DOCUMENTS

| | | |
|---|---|---|
| 3,179,138 | 4/1965 | Norris . |
| 3,587,216 | * 6/1971 | Grether et al. . |
| 4,236,581 | * 12/1980 | Beckett . |

FOREIGN PATENT DOCUMENTS

| | | |
|---|---|---|
| 457836 | 12/1944 | (BE) . |
| 1599565 | 7/1970 | (FR) . |
| 2553630 | 4/1985 | (FR) . |
| 9202065 | 6/1994 | (NL) . |

* cited by examiner

*Primary Examiner*—Kenneth W. Noland
(74) *Attorney, Agent, or Firm*—Nixon & Vanderhye P.C.

(57) ABSTRACT

Conveyor system for plants comprising at least one track, each track comprising support means (230) to hold each stalk, stem or root (2) of plants (1) with head being conveyed, guide means (210) of determined shape made up of a succession of straight and curved lines able to take any direction in three-dimensional space, and sliding means (220) within guide means (210), these sliding means being integral with support means (230) and having a translation movement that is parallel to guide means (210) to convey plants (1) over a determined route, the shape of guide means (210) being substantially identical to the line of the conveying route taken by plants (1).

6 Claims, 3 Drawing Sheets

CONVEYOR SYSTEM FOR PLANTS

FIELD OF THE INVENTION

The present invention relates to a conveyor system for plants with or without heads, flowers or herbs and spices, such as green cabbage, broccoli, cauliflower, white cabbage, Brussels sprouts, kohlrabi, and in general any type of brassica, leek, carrot, lettuce, asparagus, artichoke, onion, chive, capsicum, etc. One use is to integrate this conveyor system into a plant-harvesting agricultural machine, or to construct an independent machine that can be coupled to the agricultural machine.

BACKGROUND OF THE INVENTION

From American U.S. Pat. No. 3,821,987, equipment for harvesting lettuce is known which uses conveyors to transport the lettuce. The belt or some conveyors is fitted with foam blocks. Since the route taken by the lettuce is not rectilinear, a plurality of rectilinear conveyors is used to conduct the transport. This necessarily leads to discontinuity in lettuce support or conveyor speeds, in particular during changes of direction, and therefore carries the risk of falls of shocks causing damage to the lettuce. Also, the conveyor system taught by document U.S. Pat. No. 3,821,987 operates solely in one plane and the conveyance of the lettuce is made using the lettuce heads.

From American U.S. Pat. No. 3,690,049 a broccoli-harvesting machine is also known. This machine comprises a conveyor with two belts positioned opposite one another. Each belt is fitted with a plurality of fingers. When the belts are in movement, the fingers fit between each other to clasp and hold the broccoli stalk during its transport and processing. Although the support given to the broccoli is satisfactory, it is not possible to consider a pathway other than a rectilinear pathway for the transport and processing of the broccoli.

OBJECTS AND SUMMARY OF THE INVENTION

The purpose of the present invention is consequently to remedy the disadvantages of the prior art by providing a conveyor system able to follow a three-dimensional route with no risk of plant falls.

This purpose is reached through the fact that the conveyor system comprises at least one track, each track comprising support means to hold each stalk, stem or root of plant conveyed, guide means of a determined shape made up of a succession of straight and curved lines which can take any direction in three-dimensional space, and means sliding within the support means, said sliding means being integral with the support means, and having a translation movement that is parallel to the guide means for conveying the plants over a determined route, the form of the guide means being substantially identical to the line followed by the route of plant conveyance.

According to another particular aspect, the support means comprise a plurality of plates mounted on sliding means via a fastening tongue such that each plate is substantially parallel to the stalks, stems, or roots of the conveyed plants and that a determined space subsists between each plate, each plate also comprising means to ensure the positioning of the stalks, stems or roots of the plants.

According to another particular aspect, the guide means are formed firstly by a first profile of determined material comprising a groove whose cross section is configured to house sliding means, and secondly either by a plate that is parallel and opposite the first profile, or by a second profile that is identical to the first but parallel and with the groove opposite the groove of the first.

According to another particular aspect, the sliding means are made up of a chain of which each ink forms a variable angle determined by the guide profile with the preceding link.

According to another particular aspect, the angle formed by one link of the chain and the preceding link is substantially equal to 90° in a straight line.

According to another particular aspect, the means for positioning the stalks, stems or roots of the plants comprise at least one block of semi-rigid material relative to the rigidity of the plant and mounted on the plate, the dimensions of each block being chosen such that the outer surface of the blocks opposite the plate is at all times in contact with the plant stalks, stems or roots during the movement of the sliding means.

According to another particular aspect, the material chosen to make each profile forming the guide means and/or sliding means is a material whose outer surface has a low friction coefficient and is preferably in "Teflon".

BRIEF DESCRIPTION OF THE DRAWINGS

Other particular aspects and advantages of the present invention will become clearer on reading the following description made with reference to the appended drawings in which.

DESCRIPTION OF THE PREFERRED EMBODIMENTS

In the remainder of the description, the term "plant" denotes all the plants listed at the start of the description and the term "stalk" denotes not only the stalks of plants but also the stem or root or roots or any other part of the plant that may be used to support tie plan: while it is being conveyed.

Figure 1:
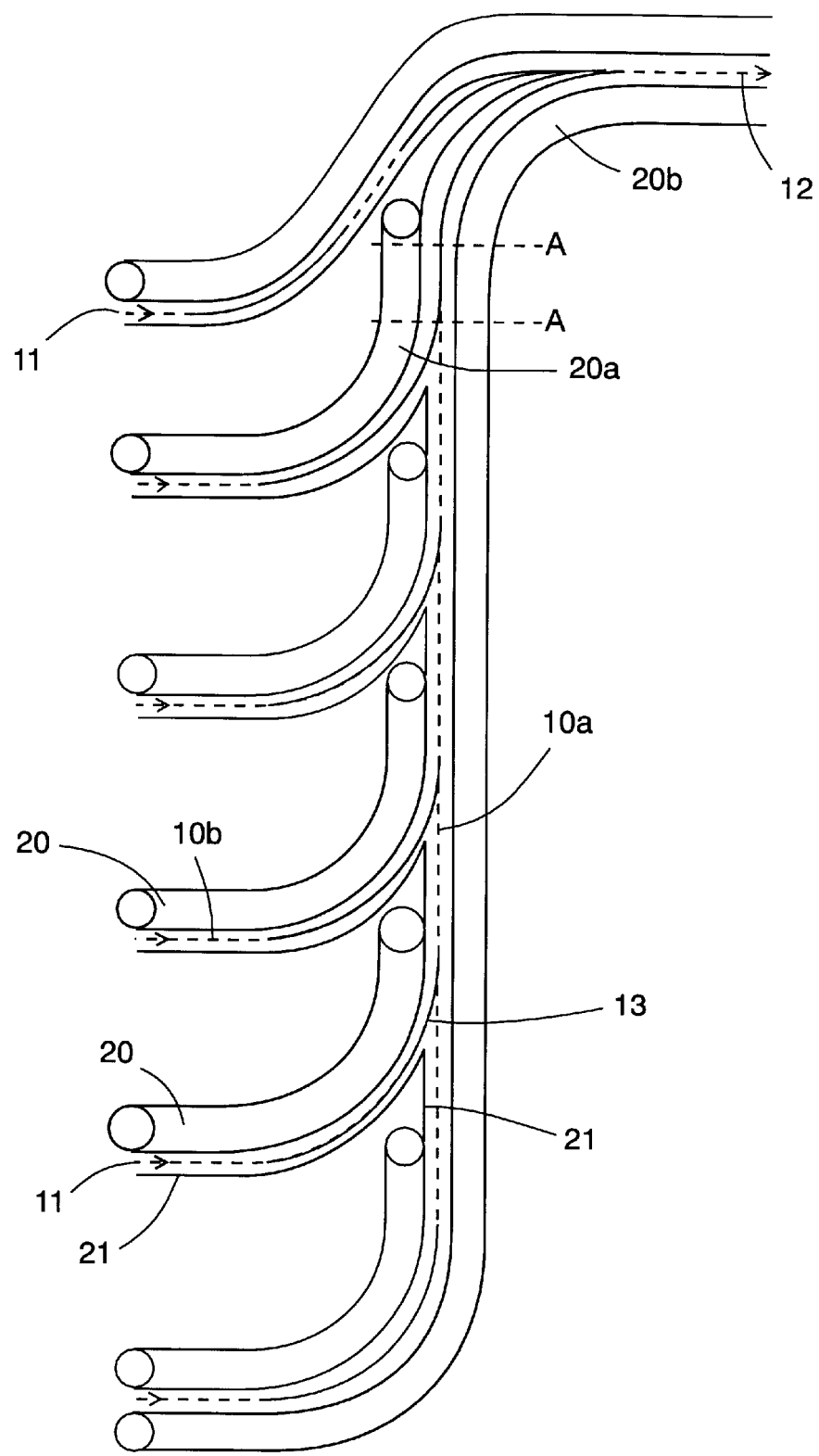
FIG. 1 shows a simplified top view of a conveyor of the invention comprising a plurality of tracks.

FIG. 1 shows a simplified, top view of a conveyor system according to the invention comprising a plurality of tracks. The conveyor system shown in FIG. 1 comprises a plurality of inlets (11) and, for example, a single outlet (12) for example towards a processing station (not shown) and/or a storage area (not shown) for the plants. The processing station may, for example, comprise a cutting station comprising means for cutting the stalk or desired parts of the plants such as knives, scissors, saws or any other means. These cutting means are positioned either above the conveyor of the invention or below. Between the inlets (11) and outlet (12) the plants are guided over a route (10). This route (10) is formed of a succession of straight and curved lines able to take any direction in space. Hence route (10) may be over a straight line, a plane or within a volume. The conveyor system of FIG. 1 comprises a plurality of conveyors (20, 20a, 20b) according to the invention, including a main conveyor (20b) and at least one secondary conveyor (20, 20a) connected to the main conveyor (20b) via an intersection (13). Plants entering the conveyor system by one of inlets (11) are then guided over route (10) either by two conveyors (20a, 20b) of the invention, or by one conveyor of the invention (20) and one parallel plate (21) positioned opposite the conveyor (20). Advantageously, the width of route (10) followed by the plants, that is to say the distance between either the two conveyors (20a, 20b) located either side of the route, or between one conveyor (20) and one plate (21) substantially corresponds to the diameter of the plant stalks, which is in the region of 40 mm when the plants with heads are cabbages.

Figure 2:
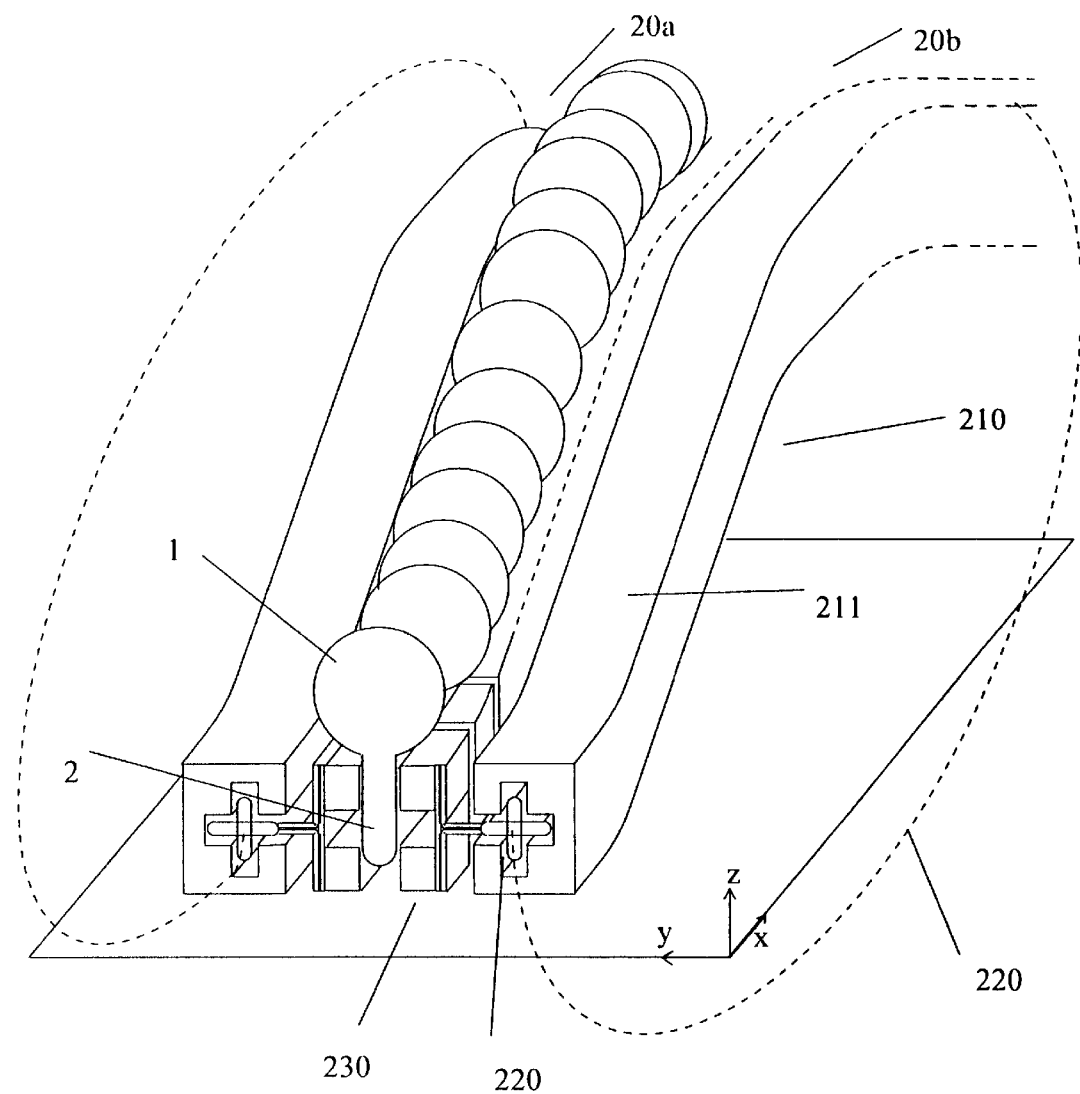
FIG. 2 shows a perspective view of the AA part of the conveyor system of FIG. 1.
Figure 3:
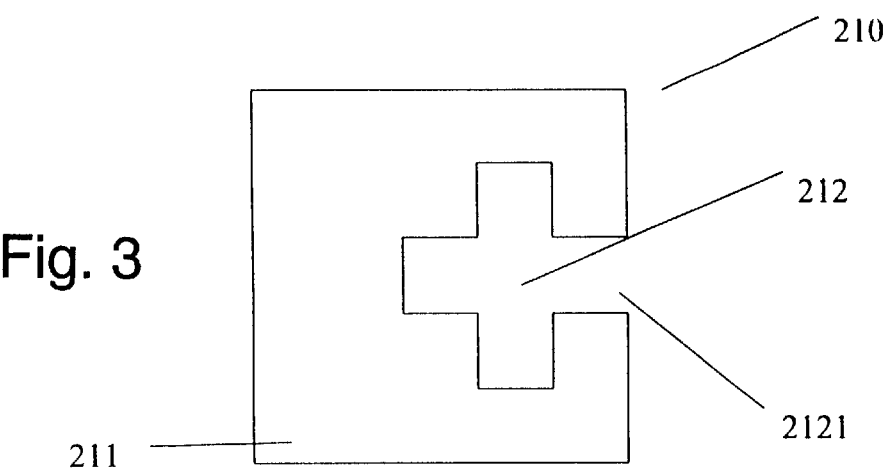
FIG. 3 shows a longitudinal section of the guide means
Figure 5:
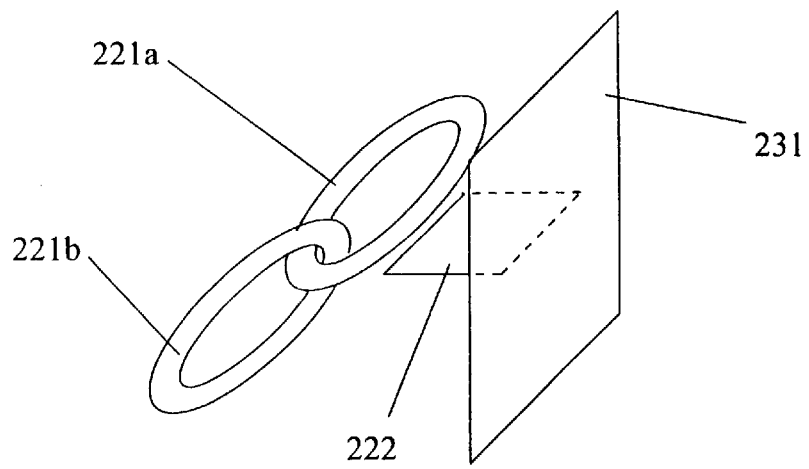
FIG. 5 shows a detailed, perspective view of the assembly of the support means on the sliding means.
Figure 4:
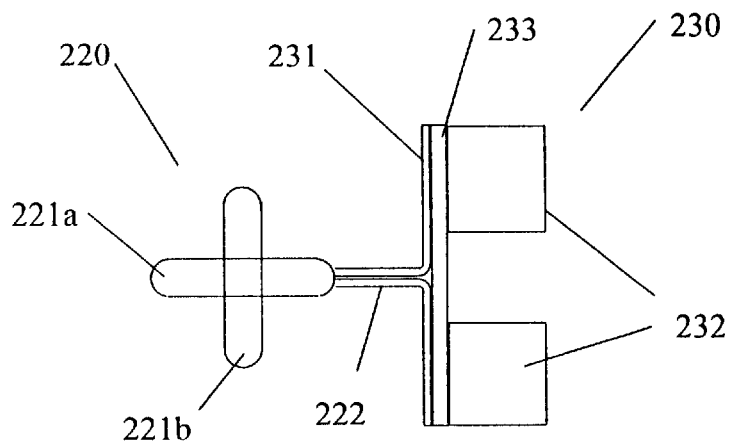
FIG. 4 shows a front view of the sliding means and support means

The conveyor of the invention will be described below with reference to FIGS. 2 to 4. Part AA (shown in FIG. 2) of the conveyor system of FIG. 1 is made up of two conveyors (20a, 20b). Each conveyor comprises guide means (210), sliding means (220) within guide means (210), and support means (230) integral with sliding means (220). Guide means (210) comprise a single-block profile (211, FIGS. 2 and 3) of determined shape, in which a groove is made (212 FIG. 3) whose cross section substantially corresponds to the shape of the cross section of sliding means (220) The shape of each profile (210) is identical to the route (10, FIG. 1) desired for conveying the plants. In other words, profile (210) is formed of a succession of straight and curved lines which may take any direction in three-dimensional space outlined by the markings (x, y and Z) in FIG. 2. In this manner, the conveyance route followed by the plants may form a twist or follow a helical route. In FIG. 1, the route taken by part AA (shown in FIG. 2) is located in a plane perpendicular to the marking (x, y, z). However, any person skilled in the art would be able to design a part (not shown) located in the extension of part AA and oriented in any direction in a plane, for example parallel to the plane containing the marking (x ,y, z).

Means (220) sliding within groove (212) of profile (211) are, for example, made up of a marine chain (220) forming a loop. Said chain (220) is formed of a succession of links (221) of determined size, such that each link (221a) articulates in any direction with the following or preceding link by means of the curves of the guide profile forming a determined variable angle with link (221b) which precedes or follows after it. Advantageously, the planes containing a link form an angle substantially equal to 90° with the preceding or following link when they follow a rectilinear guide profile. When chain (220) is inserted in cross-shaped groove (212) of profile (210), one in every two links (221a) can be accessed from outside profile (210) via an opening (2121) in groove (212) of the profile.

The translation movement of chain (220) in groove (212) of profile (211) is ensured, for example, by a pulley system driven in rotation by all types of motors (thermal, electric . . . ).

The material chosen to make profile (211) and/or chain (220) is a material whose surface has a low friction coefficient such as "Teflon" for example. The chain may be in metal and the guide may be "Teflon"-coated.

Support means (230) are integral with sliding means (220). When being conveyed, plants (1) are supported via their stalk (2) between support means (230) made of two chains (220) or of one chain (220) and one plate (21, FIG. 1). If the sliding means (220) are formed of one chain, the joining of support means (230) is made via a plurality of fastening tongues (222). Each fastening tongue (222) is fixed firstly to the accessible link (221a) of the chain and secondly to a plate (231) of the support means (230).

Support means (230) comprise a plurality of plates (231) of determined size. Each plate (231) is fixed to a fastening tongue (222) integral with the chain (220). Each plate (231) also comprises at least one block (232) of material that is semi-rigid relative to the rigidity of the plant, that is of flexible foam type in synthetic material such as polyurethane foam. The semi-rigid blocks (232) may be made in any synthetic material or honeycombed or not such as brushes or looped fabrics. Each foam block (232) is fixed to plate (231) via a fabric (233) covering the surface of plate (231) intended to house the foam blocks (232). The sizes of foam blocks (232) are determined such that they do not project beyond the limits of the surface formed by the plate and such that the surface of blocks (232) opposite the surface of plate (231) always remains in contact with the stalk (2) of plants (1) during their transport along the conveying route. The use of blocks (232) in semi-rigid material enables the conveying of plants (1) whose stalk (2) is not of homogeneous size. Whenever the dimensions of stalks (2) are greater than normal, foam blocks (232) deform to fit tightly around stalk (1).

In advantageous manner, the length of links (221) of chain (220) is shorter than the length of each plate (231). The length of each plate (231) is chosen such that two consecutive plates are distanced by a gap that is less than the size of the stalk so as not to allow the passing of stalk (2) of plant (1) even in the most unfavorable configurations, that is to say in curves in which the plurality of plates (231) is located outside the pathway. The height of each plate (231) is determined to give maximum support to stalk (2) of plant (1). The thickness of the blocks (232) in semi-rigid material is chosen such that the width of the route taken by stalks (2) of plants (1) is in the region of 40 mm.

By way of example, for a stalk diameter (2) in the region of 40 mm, the thickness of chain links (221) is in the order of 2 mm and their length in the order of 20 m, plate height is in the order of 40 mm and plate width in the order of 28 mm With these dimensions, it is possible to obtain a distance between each plate (231) in the order of 4 mm and therefore to achieve continuity in the conveying of plants (1).

The functioning of a conveyor system according to the invention is as follows: as soon as slants (1) enter (10) the conveyor system of the invention, their stalk (2) is held either between foam blocks (232) of a first and second conveyor (20) of the invention, or between the foam blocks (232) of a conveyor of the invention and a plate (21) that is parallel and opposite the conveyor. The movement of chain (220) in groove (212) of profile (211) causes the movement of stalks (2) of plants (1) along the route (10), stalks (2) remaining held by foam blocks (232). When route (10) comprises an intersection (13), that is to say when at least two route sections (10a, 10b) merge into one, plants (1) on each section upstream from intersection (13) are carried between the main conveyor (20b) and plate (21) of intersection (13) and are optionally pushed by the plants arriving upstream via main route (10a). They then mix with the plants arriving at another intersection coming from another secondary conveyor (20) to be driven, while maintaining the continuity of conveyance, over the route section (10) situated downstream. Each secondary conveyor (20, 20a) has a joint route section (10a, 10b) with the main conveyor (20b) which adopts the entire shape and path of the conveying route.

Therefore, irrespective of the route (10) configuration in space, and irrespective of the number of inlets (11), the conveyor system of the invention allows the transport of plants (1) with heads by using their stalk (2). Through support being given to the stalks (2) and not to the heads of the plants, it is possible to maintain the intactness of the plant heads (1).

It is evident that other modifications within the reach of persons skilled in the art come under the scope of this invention.

What is claimed is:

1. Conveyor system for plants comprising at least one track, each track comprising a support assembly for holding each stalk, stem or root of the plants with heads of said plants being transported, a guide having a determined shape and made up of a succession of straight and curved portions able to extend in any direction in three-dimensional space and a defining a transport route, and a slide within the guide, said slide being integral with the support assembly and having a translation movement that is parallel to the guide to convey the plants over the transport route, the shape of the guide being substantially identical to the transport route taken by the plants, and further wherein the support assembly comprises a plurality of plates mounted on the slide via a fastening tongue such that each plate is substantially parallel to the stalks, stems or roots of the conveyed plants and such that a determined space exists between each plate, each plate also comprising positioners to position the stalks, stems or roots of the plants.

2. Conveyor system for plants in accordance with claim 1, wherein the guide is formed to have a first profile comprising a groove whose cross section is configured to house the slide, and secondly to have either a plate that is opposite and parallel to the first profile, or a second profile that is identical to the first profile and parallel thereto so that a groove thereof is opposite to the groove of the first profile.

3. Conveyor system for plants in accordance with claim 2, wherein a material chosen to make guide and/or the slide is a material whose outer surface has a low friction coefficient.

4. Conveyor system for plants comprising at least one track, each track comprising a support assembly for holding each stalk, stem or root of the plants with heads of said plants being transported, a guide having a determined shape and made up of a succession of straight and curved portions able to extend in any direction in three-dimensional space and a defining a transport route, and a slide within the guide, said slide being integral with the support assembly and having a translation movement that is parallel to the guide to convey the plants over the transport route, the shape of the guide being substantially identical to the transport route taken by the plants, wherein the slide is made up of a chain in which each link forms a variable angle determined by the guide profile with a preceding link.

5. Conveyor system for plants in accordance with claim 4, wherein an angle formed by one link of the chain with the preceding link is substantially equal to 90° in a straight line.

6. Conveyor system for plants in accordance with claim 5, wherein the positioners for positioning the stalks, stems or roots of plants comprise at least one block of material that is semi-rigid relative to a rigidity of the plant and is mounted on the plate, the dimensions of each block being chosen such that an outer surface of the blocks, opposite the plate, remains in contact with the stalks, stems or roots of plants during movement of the slide.

\* \* \* \* \*